United States Patent

Broberg et al.

[11] Patent Number: 5,584,896
[45] Date of Patent: Dec. 17, 1996

[54] COATED ABRASIVE ARTICLE HAVING DILUENT PARTICLES AND SHAPED ABRASIVE PARTICLES

[75] Inventors: David E. Broberg, Woodbury; Donna W. Bange, Eagan, both of Minn.

[73] Assignee: Minnesota Mining and Manufacturing Company, St. Paul, Minn.

[21] Appl. No.: 493,177

[22] Filed: Jun. 21, 1995

Related U.S. Application Data

[63] Continuation of Ser. No. 222,161, Apr. 4, 1994, abandoned, which is a continuation of Ser. No. 32,983, Mar. 18, 1993, abandoned.

[51] Int. Cl.$^6$ .............................. B24D 11/00; B24B 1/00
[52] U.S. Cl. ................. 51/295; 51/309; 51/293
[58] Field of Search .......................... 51/293, 295, 309

[56] References Cited

U.S. PATENT DOCUMENTS

| | | | |
|---|---|---|---|
| 1,910,444 | 5/1933 | Nicholson | 51/308 |
| 2,194,472 | 3/1940 | Jackson | 51/185 |
| 3,041,156 | 6/1962 | Rowse et al. | 51/298 |
| 3,079,242 | 2/1963 | Glasgow | 48/192 |
| 3,377,660 | 4/1968 | Marshall et al. | 18/26 |
| 3,491,492 | 1/1970 | Ueltz | 51/309 |
| 3,637,630 | 1/1972 | Dorfman et al. | 260/88.7 |
| 4,073,096 | 2/1978 | Ueltz et al. | 51/309 |
| 4,132,533 | 1/1979 | Lohmer et al. | 51/295 |
| 4,194,887 | 3/1980 | Ueltz et al. | 51/309 |
| 4,252,544 | 2/1981 | Takahashi | 51/309 |
| 4,311,489 | 1/1982 | Kressner | 51/298 |
| 4,314,827 | 2/1982 | Leitheiser et al. | 51/298 |
| 4,393,021 | 7/1983 | Eisenberg et al. | 264/143 |
| 4,541,842 | 9/1985 | Rostoker | 51/296 |
| 4,543,106 | 9/1985 | Parekh | 51/295 |
| 4,623,364 | 11/1986 | Cottringer et al. | 51/309 |
| 4,652,275 | 3/1987 | Bloecher et al. | 51/298 |
| 4,734,104 | 3/1988 | Broberg | 51/309 |
| 4,737,163 | 4/1988 | Larkey | 51/309 |
| 4,744,802 | 5/1988 | Schwabel | 51/309 |
| 4,770,671 | 9/1988 | Monroe et al. | 51/293 |
| 4,773,920 | 9/1988 | Chasman et al. | 51/293 |
| 4,799,939 | 1/1989 | Bloecher et al. | 51/293 |
| 4,848,041 | 7/1989 | Kruschke | 51/309 |
| 4,855,264 | 8/1989 | Mathers et al. | 501/98 |
| 4,881,951 | 11/1989 | Wood et al. | 51/309 |

(List continued on next page.)

FOREIGN PATENT DOCUMENTS

| | | | |
|---|---|---|---|
| 0119498 | 9/1984 | European Pat. Off. | |
| 0228856 | 7/1987 | European Pat. Off. | C09K 3/14 |
| 293163 | 11/1988 | European Pat. Off. | |
| 0395088 | 10/1990 | European Pat. Off. | C09K 3/14 |
| 0471389 | 2/1992 | European Pat. Off. | B24D 3/34 |
| 0480133 | 4/1992 | European Pat. Off. | B24D 3/34 |
| 3042643 | 7/1981 | Germany | B24D 3/02 |

OTHER PUBLICATIONS

Abstract CA 802 150 1968 (No Month).

*Primary Examiner*—Deborah Jones
*Attorney, Agent, or Firm*—Gary L. Griswold; Walter N. Kirn; Doreen S. L. Gwin

[57] ABSTRACT

Seated abrasive articles containing particles having specified shapes. The coated abrasive comprises:

a. a backing;

b. at least one binder;

c. an abrasive coating comprising shaped abrasive particles and diluent particles said at least one binder serving to bond the abrasive coating to the backing. The diluent particles can comprise (1) a plurality of individual abrasive particles bonded together by an adhesive to form an agglomerate, (2) a plurality of individual non-abrasive particles bonded together by an adhesive to form an agglomerate, (3) a plurality of individual abrasive particles and a plurality of individual non-abrasive particles bonded together by an adhesive to form an agglomerate, (4) individual non-abrasive particles, (5) individual abrasive particles, or (6) combinations of the foregoing.

11 Claims, 6 Drawing Sheets

U.S. PATENT DOCUMENTS

| | | | |
|---|---|---|---|
| 4,957,886 | 9/1990 | Mathers et al. | 501/96 |
| 4,964,883 | 10/1990 | Morris et al. | 51/293 |
| 4,988,554 | 1/1991 | Peterson et al. | 51/295 |
| 4,997,461 | 3/1991 | Markoff-Matheny et al. | 51/295 |
| 5,009,675 | 4/1991 | Kunz et al. | 51/295 |
| 5,009,676 | 4/1991 | Rue et al. | 51/309 |
| 5,011,508 | 4/1991 | Wald et al. | 51/293 |
| 5,011,512 | 4/1991 | Wald et al. | 51/295 |
| 5,035,724 | 7/1991 | Pukari et al. | 51/309 |
| 5,042,991 | 8/1991 | Kunz et al. | 51/295 |
| 5,078,753 | 1/1992 | Broberg et al. | 51/298 |
| 5,085,671 | 2/1992 | Martin et al. | 51/293 |
| 5,090,968 | 2/1992 | Pellow | 51/293 |
| 5,093,311 | 3/1992 | Shiota et al. | 505/1 |
| 5,103,598 | 4/1992 | Kelly | 51/295 |
| 5,110,322 | 5/1992 | Narayanan et al. | 51/309 |
| 5,135,546 | 8/1992 | Sato et al. | 51/295 |
| 5,201,916 | 4/1993 | Berg et al. | 51/293 |
| 5,366,523 | 11/1994 | Rowenhorst et al. | 51/293 |

COATED ABRASIVE ARTICLE HAVING DILUENT PARTICLES AND SHAPED ABRASIVE PARTICLES

This is a continuation of application Ser. No. 08/222,161, filed Apr. 4, 1994, now abandoned, which is a continuation of 08/032,983, filed Mar. 18, 1993, now abandoned.

BACKGROUND OF THE INVENTION

1. Field of the Invention

This invention relates to coated abrasive articles, and, more particularly, to coated abrasive articles containing particles having specified shapes.

2. Discussion of the Art

Three basic technologies that have been employed to produce abrasive grains having a specified shape are (1) fusion, (2) sintering, and (3) chemical ceramic.

In the fusion process, abrasive grains can be shaped by a chill roll, the face of which may or may not be engraved, a mold into which molten material is poured, or a heat sink material immersed in an aluminum oxide melt. U.S. Pat. No. 3,377,660 discloses a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor, whereupon the partially fractured strip is deposited onto a collector in the form of large fragments, which, upon being rapidly cooled and solidified, break up into smaller fragments capable of being reduced in size to form conventional abrasive grains. U.S. Pat. Nos. 4,073,096 and 4,194,887 disclose a process comprising the steps of (1) fusing an abrasive mix in an electric arc furnace, (2) dipping a relatively cold substrate into the molten material, whereby a layer of solid abrasive material is quickly frozen (or plated) on the substrate, (3) withdrawing the plated substrate from the molten material, and (4) breaking the solidified abrasive material away from the substrate and collecting it for further processing to produce abrasive grains.

In the sintering process, abrasive grains can be formed from refractory powders having a particle size of up to 10 micrometers in diameter. Binders can be added to the powders along with a lubricant and a suitable solvent, e.g., water. The resulting mixtures, pastes, or slurries can be shaped into platelets or rods of various lengths and diameters. The resulting shaped grains must be fired at high temperatures, e.g., 1,400° C. to 1,800° C., at high pressures, or for long soak times, e.g., up to 10 hours. Crystal size may range from under one micrometer up to 25 micrometers. To obtain shorter residence times and/or smaller crystal size, either the pressure or temperature must be increased. U.S. Pat. No. 3,079,242 discloses a method of making abrasive grains from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size. U.S. Pat. No. 4,252,544 discloses alumina abrasive grains produced by sintering wherein the grain structure is constructed of alumina coarse crystal particles and alumina fine crystal particles located between the alumina coarse crystal particles. U.S. Pat. No. 3,491,492 discloses a process for making an aluminous abrasive grain formed from bauxite or mixtures of bauxite and Bayer process alumina wherein the comminuted aluminous material is mixed with water and ferric ammonium citrate, or with ferric ammonium citrate and citric acid, and reduced to a state of fine subdivision by milling to give a fluid slurry of high solid content, drying said slurry to coherent cakes having a thickness equal to one dimension of the final grain before sintering, breaking said cakes to grains, screening, optionally rounding said grains by air mulling, screening, sintering, cooling, and screening to yield the final product. U.S. Pat. No. 3,637,630 discloses a process in which the same type of slurry disclosed in U.S. Pat. No. 3,491,492 is plated or coated on a rotating anode of an electrophoretic cell. The plated aluminous material is removed from the rotating anode, dried, broken to granules, screened, sintered, and screened to final size.

Chemical ceramic technology involves converting a colloidal dispersion or hydrosol (sometimes called a sol), optionally in a mixture with solutions of other metal oxide precursors, to a gel or any other physical state that restrains the mobility of the components, drying, and firing to obtain a ceramic material. A sol can be prepared by any of several methods, including precipitation of a metal hydroxide from an aqueous solution followed by peptization, dialysis of anions from a solution of metal salt, solvent extraction of an anion from a solution of a metal salt, hydrothermal decomposition of a solution of a metal salt having a volatile anion. The sol optionally contains metal oxide or precursor thereof and is transformed to a semi-rigid solid state of limited mobility such as a gel by, e.g., partial extraction of the solvent, e.g., water. Chemical ceramic technology has been employed to produce ceramic materials such as fibers, films, flakes, and microspheres. U.S. Pat. No. 4,314,827 discloses synthetic, non-fused aluminum oxide based abrasive mineral having a microcrystalline structure of randomly oriented crystallites comprising a dominant continuous phase of alpha alumina and a secondary phase. U.S. Pat. No. 4,744,802 discloses an abrasive grain made by a chemical ceramic process that employs an iron oxide nucleating agent to enhance the transformation to alpha alumina. This patent also suggests that the gel can be shaped by any convenient method such as pressing, molding, or extruding. U.S. Pat. No. 4,848,041 discloses a shaped abrasive grain made by a chemical ceramic process in which the abrasive grain has a mean particle volume ratio of less than 0.8.

SUMMARY OF THE INVENTION

This invention provides coated abrasive articles containing both abrasive particles having specified shapes and diluent particles.

The coated abrasive article comprises:

a. a backing;

b. at least one binder;

c. an abrasive coating comprising shaped abrasive particles and diluent particles, said at least one binder serving to bond the abrasive coating to the backing. The diluent particles can comprise (1) a plurality of individual abrasive particles bonded together by an adhesive to form an agglomerate, (2) a plurality of individual non-abrasive particles bonded together by an adhesive to form an agglomerate, (3) a plurality of individual abrasive particles and a plurality of individual non-abrasive particles bonded together by an adhesive to form an agglomerate, (4) individual non-abrasive particles, (5) individual abrasive particles, or (6) combinations of the foregoing. More than one class of diluent particles can be used in the coated abrasive article. The individual abrasive particles and the agglomerates containing individual abrasive particles have irregular shapes or random shapes, i.e., they are excluded from the scope of the shaped abrasive particles. However, individual non-abrasive particles and agglomerates containing non-abrasive particles, but free from individual abrasive particles, can have shapes that are equivalent to those of the shaped abrasive particles.

The abrasive coating can take on several types of configurations. However, most of the configurations fall into four major categories:

(1) open coat of diluent particles and open coat of shaped abrasive particles;

(2) open coat of diluent particles and closed coat of shaped abrasive particles;

(3) closed coat of diluent particles and open coat of shaped abrasive particles; and (4) closed coat of diluent particles and closed coat of shaped abrasive particles.

In the first two configurations, the shaped abrasive particles reside substantially between the diluent particles. In the latter two configurations, the shaped abrasive particles reside substantially between and above the diluent particles.

In one aspect of the invention, the diluent particles are coated first and then the shaped abrasive particles are coated next. The shaped abrasive particles are preferably coated in an electrostatic field. The electrostatic field lines concentrate at the corners and along the edges of the shaped abrasive particles, and the shaped particles orient in the electrostatic field in such a way that they are deposited onto the binder or diluent particles on their thinnest edges, thereby allowing thin edges of the shaped particles to be in contact with the workpiece during abrading operations. For particles having triangular-shaped faces, about 35% to about 65% of the particles are typically oriented with a vertex pointing away from the backing and a base in contact with the binder or diluent particles, with the remainder being oriented with a base pointing away from the backing and a vertex in contact with the binder or diluent particles.

In another aspect of the invention, the diluent particles and the shaped abrasive particles are first blended and then coated at the same time.

One method for preparing such shaped abrasive particles comprises the steps of:

(a) providing a dispersion comprising particles that can be converted into alpha alumina, preferably particles of alpha alumina monohydrate, in a liquid, which liquid comprises a volatile component;

(b) providing a mold having a first generally planar surface and a second surface opposed to said first surface, said first surface having an opening to a mold cavity having a specified shape;

(c) introducing said dispersion into said mold cavity, preferably such that no exposed surface of said dispersion extends substantially beyond the plane of said first surface of said mold;

(d) removing a sufficient portion of said volatile component of said liquid from said dispersion while said dispersion is in said mold cavity, thereby forming a precursor of an abrasive particle having a shape approximately corresponding to the shape of said mold cavity;

(e) removing said precursor of the abrasive particle from said mold cavity;

(f) calcining said removed precursor of the abrasive particle; and (g) sintering said calcined precursor to form the desired abrasive particle.

In one variation of the process for making shaped abrasive particles, after the dispersion is formed, it is gelled prior to being introduced into the mold cavity. As used herein, the term "to gel" means to increase the viscosity of a substance sufficiently so that it will not flow from an inverted test tube. In a second variation, the dispersion is introduced into the mold cavity under a pressure of less than 100 psi. In a third variation, at least one side of the mold, i.e., the side in which the cavity is formed, is exposed to the atmosphere surrounding the mold during the step in which the volatile component is removed. In a fourth variation, the volatile component of the dispersion is removed from the dispersion while the dispersion is in the mold without the application of additional heat or pressure. In a fifth variation, the volatile component of the dispersion is removed from the dispersion by evaporation while the dispersion is in the mold. In a sixth variation, an additional drying step is utilized after the precursor of the abrasive particle is removed from the mold.

Preferably, the mold contains a plurality of cavities, more preferably at least twenty cavities. Preferably, the shapes of the cavities correspond approximately to the desired shapes of the abrasive particles. It is also preferred that the cavities are of equal size and shape.

Another method for preparing shaped abrasive particles comprises the steps of:

(a) providing a dispersion comprising particles that can be converted into alpha alumina, preferably particles of alpha alumina monohydrate, in a liquid, which liquid comprises a volatile component;

(b) extruding the dispersion through an orifice of a die, thereby forming an elongated precursor of an abrasive particle, said precursor having a cross-section substantially similar to that of the orifice of the die;

(c) removing a sufficient portion of the volatile component of the liquid from the elongated precursor of the abrasive particle such that the precursor is sufficiently dry so as to be capable of maintaining its elongated shape and cross-section;

(d) converting the dried precursor of the abrasive particle to the desired length;

(e) calcining said dried precursor of the abrasive particle; and (f) sintering said calcined precursor to form the desired abrasive particle.

The shaped abrasive particles can have shapes that can be characterized as thin bodies having faces of triangular, rectangular, including square, circular, or other geometric shape. It is preferred that the geometric shape of the faces of the shaped abrasive particles be triangular. The shaped abrasive particles preferably have a front face and a back face, both of which faces have substantially the same geometric shape. The faces are separated by the thickness of the particle. The ratio of the length of the shortest facial dimension of an abrasive particle to its thickness is at least 1 to 1, preferably at least 2 to 1, more preferably at least 5 to 1, and most preferably at least 6 to 1. The shaped abrasive particles can have shapes that can be characterized as rods. For example, the rods can be cylindrical or prismatic in shape, with the ratio of length to maximum cross-sectional dimension being at least 1 to 1, preferably 2 to 1, and most preferably at least 3 to 1.

DETAILED DESCRIPTION

Figure 1:
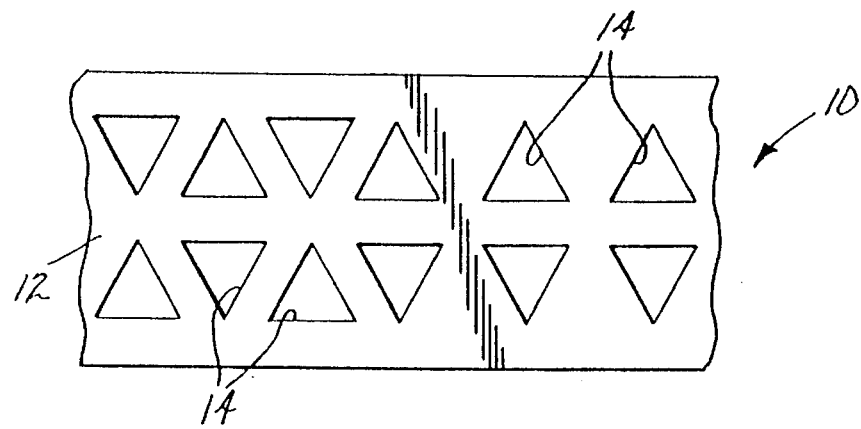
FIG. 1 is a top view of a mold suitable for preparing shaped abrasive particles.

As used herein, the term "dispersion" means the unsolidified, undried composition comprising particles that can be converted into alpha alumina in a flowable binder precursor. The dispersion is used for preparing shaped abrasive particles. Shaping can be accomplished by molding or by extruding and sizing. After the dispersion is shaped, sufficient volatile component is removed therefrom to bring about solidification of the resultant shaped dispersion. The term "precursor of shaped abrasive particle" means the unsintered particle produced by removing a sufficient amount of the volatile component from the dispersion so as to form a solidified body having a shape. If the shaping is effected by means of molding, the precursor of the shaped particle will have a shape corresponding approximately to the shape of the mold cavity in which it was prepared. If the shaping is effected by means of extrusion through the orifice of a die, the precursor of the shaped particle will have a cross-section corresponding approximately to the shape of the orifice of the extrusion die. After shaping and removal of volatile component, the resulting shaped particle will be sintered, whereby density of the particle will have a value of at least 90% of theoretical density. The term "shaped abrasive particle" means a sintered particle, which can be produced by the process of assignee's copending applications U.S. Ser. Nos. 07/919,179, filed Jul. 23, 1992, now U.S. Pat. No. 5,201,916, and 07/918,360, filed Jul. 23, 1992, both of which are incorporated herein by reference.

The first step of a preferred process for making shaped abrasive particles involves providing a dispersion comprising a liquid containing particles that can be converted into alpha alumina, which liquid comprises a volatile component, preferably water. The dispersion should comprise a sufficient amount of liquid to cause the viscosity of the dispersion to be sufficiently low to ensure ease of introduction into the mold cavity or through an extrusion die, but not so much liquid as to cause subsequent removal of the liquid to be prohibitively expensive. The dispersion preferably comprises from about 2 to about 90% by weight of the particles that can be converted into alpha alumina, preferably particles of alpha aluminum oxide monohydrate (boehmite), and at least 10% by weight, preferably from 50 to 70%, more preferably 50 to 60%, by weight, volatile component, preferably water. Conversely, the dispersion preferably contains from 30 to 50%, more preferably 40 to 50%, by weight solids. If the percentage of liquid is too high, too many cracks can develop in the resulting particles upon drying thereof. If the percentage of liquid is too low, pumping of the dispersion into the mold may be difficult. Aluminum oxide hydrates other than boehmite can also be used. Boehmite can be prepared by known techniques or can be obtained commercially. Examples of commercially available boehmite include products having the trademarks "DISPERAL", available from Condea Chemie, GMBH and "DISPAL", available from Vista Chemical Company. These aluminum oxide monohydrates are in the alpha form, are relatively pure, i.e., they include relatively little, if any, hydrate phases other than monohydrates, and have a high surface area. The physical properties of the shaped abrasive particles will generally depend upon the type of material used in the dispersion.

It is preferred that the dispersion be in a gel state. As used herein, "a gel" is a three dimensional network of solids dispersed in a liquid. A gel will not flow from an inverted test tube.

The dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the dispersion is not critical and can be varied on the basis of convenience. Typically, the introduction of a modifying additive or precursor of a modifying additive will cause the dispersion to gel. The dispersion can also be induced to gel by application of heat over a period of time.

The dispersion can also contain a nucleating agent to enhance the transformation of hydrated or calcined aluminum oxide to alpha alumina. Nucleating agents suitable for this invention include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such dispersions is disclosed in U.S. Pat. Nos. 4,744,802 and 4,964,883, both of which are incorporated hereinafter by reference.

A peptizing agent can be added to the dispersion to produce a more stable hydrosol or colloidal dispersion. Peptizing agents preferred for this invention are monoprotic acids or acid compounds such as acetic acid, hydrochloric acid, formic acid, and nitric acid, with nitric acid being preferred. Multiprotic acids are less preferred as peptizing agents because they rapidly gel the dispersion, making it difficult to handle or to introduce additional components thereto. Some commercial sources of boehmite contain an acid titer (such as absorbed formic or nitric acid) that will assist in forming a stable dispersion.

The dispersion can be formed by any suitable means, such as, for example, simply by mixing aluminum oxide monohydrate with water containing a peptizing agent or by forming an aluminum oxide monohydrate slurry to which the peptizing agent is added.

Figure 2:
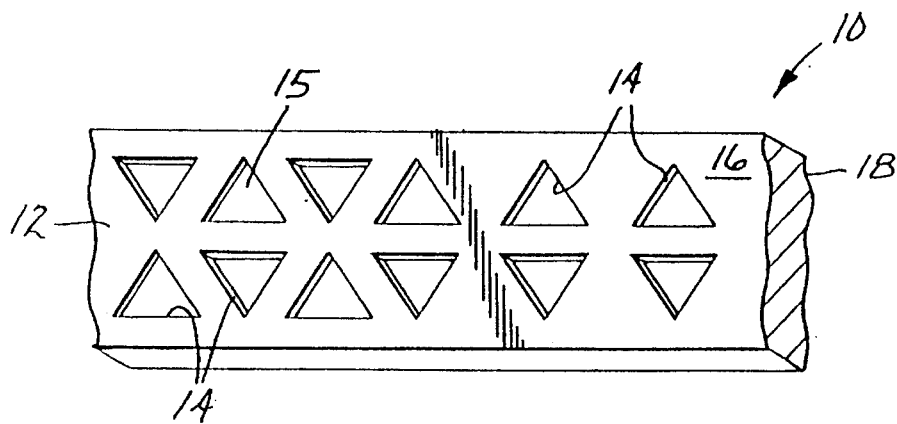
FIG. 2 is a perspective view of a mold suitable preparing shaped abrasive particles.

The second step of the process of making shaped abrasive particles involves providing a mold having at least one cavity, preferably a plurality of cavities. Referring to FIG. 1, a mold 10 has a generally planar surface 12 and a plurality of cavities 14. Mold 10 can be made from a rigid material, such as metal, e.g., steel. It is preferred that mold 10 be made from a relatively thin aluminum or stainless steel sheet or belt, e.g., having a thickness of less than 5 cm, preferably less than 2 cm. Referring to FIG. 2, access to cavities 14 of mold 10 can be from an opening 15 in first or top surface 16 of mold 10, from an opening (not shown) in second or bottom surface 18 of mold 10, or from openings in both surfaces of mold 10. In some instances, cavities 14 can extend for the entire thickness of mold 10. Alternatively, cavities 14 can extend only for a portion of the thickness of mold 10. It is preferred that top surface 16 of mold 10 be substantially parallel to bottom surface 18 of mold 10. At least one side of mold 10, i.e., the side in which the cavity is formed, can remain exposed to the surrounding atmosphere during the step in which the volatile component is removed. If the cavities extend completely through the mold, both surfaces of the mold should be generally planar. As used herein, the term "planar" includes any two-dimensional surface. However, it is preferred that the planar surfaces be flat or level.

The cavities 14 have a specified three-dimensional shape. The preferred shape of a cavity can be described as being a triangle having a dimension of depth. However, other shapes can be used, such as, circles, rectangles, squares, or combinations thereof, all having a dimension of depth. The dimension of depth is equal to the perpendicular distance from the surface 12 to the lowermost point of cavity 14. In addition, a cavity can have the inverse of other geometric shapes, such as, for example, pyramidal, frusto-pyramidal, truncated spherical, truncated spheroidal, conical, and frusto-conical. There are preferably at least 20 cavities per mold, more preferably at least 100 cavities per mold. The depth of a given cavity can be uniform or can vary along its length and/or width. The cavities of a given mold can be of the same shape or of different shapes.

It is preferred that the dimensions of cavities 14 approximately correspond to the desired dimensions of the shaped abrasive particles, taking expected shrinkage into account. Accordingly, it will not be necessary to crush, break, or cut the shaped abrasive particles to reduce their size. Likewise, after the shaped abrasive particles are made by the process described herein, it is not necessary to screen them to an appropriate particle size. Moreover, the size of the shaped abrasive particles will essentially remain constant between different lots, thereby assuring a very consistent particle size and distribution of particle sizes from lot to lot.

The third step of the process of making shaped abrasive particles involves introducing the dispersion into cavities 14 by any conventional technique. It is preferred to flood surface 12 of mold 10 with the dispersion. The dispersion can be pumped onto surface 12 of mold 10. Next, a scraper or leveler bar can be used to force some of the dispersion into cavities 14 of mold 10. The remaining portion of the dispersion that does not enter cavities 14 can be removed from surface 12 of mold 10 and recycled. Although a small portion of the dispersion can still be allowed to remain on surface 12 of mold 10, this is not preferred. The pressure applied by the scraper or leveler bar is typically less than 100 psi, preferably less than 50 psi, and most preferably less than 10 psi. Furthermore, no exposed surface of the dispersion should extend substantially beyond the planes formed by the planar surfaces of the mold to ensure uniformity in thickness of the shaped abrasive particles. It is also preferred that the planar surface of the mold surrounding the cavities be substantially free of the dispersion.

It is preferred that a release coating be applied to surface 12 of mold 10 and on the surfaces of cavities 14 prior to the introduction of the dispersion into cavities 14. The function of the release coating is to allow ease of removal of the precursors of the shaped abrasive particles. Typical materials for preparing release coatings are silicones and polytetrafluoroethylene.

The fourth step of the process of making shaped abrasive particles involves removing a portion of the liquid, i.e., the volatile component thereof, from the dispersion while the dispersion is in the mold cavity, thereby resulting in an increase in the viscosity of the dispersion. It is preferred that the volatile component be removed by evaporation rather than by an external force such as filtration. Removal of liquid by evaporation can occur at room temperature or at elevated temperatures. The elevated temperatures can range from about 40° C. to about 300° C. However, at higher temperatures, high drying rates are obtained that may produce undesirable cracks in the resulting abrasive particle. When water is the volatile component, it is preferred to heat the mold containing the dispersion at a temperature of from about 50° C. to about 80° C. for from about 10 to about 30 minutes in a forced air oven. A sufficient amount of the volatile component must be removed from the dispersion to bring about solidification thereof, thereby forming a precursor of a shaped abrasive particle having approximately the same shape as the shape of the mold cavity. It is preferred that a sufficient amount of volatile component be removed from the dispersion so that the precursors of the shaped abrasive particles can be easily removed from the cavities of the mold. Typically, up to 40% of the liquid is removed from the dispersion in this step.

The fifth step of the process of making shaped abrasive particles involves removing the precursors of the shaped abrasive particle from the mold cavities. This step is made possible by shrinkage of the dispersion, during formation of the precursors of the shaped abrasive particles, when the liquid is removed therefrom. For example, it is not uncommon for the volume of the precursor of the shaped abrasive particle to be 80% or less of that of the shaped dispersion from which it was formed. The precursors of the shaped abrasive particles can be removed from the cavities either by gravity or by applying a low pressure, e.g., rotating brush, to force them out of the cavities.

The removed precursors of the shaped abrasive particles have approximately the same shape as the cavities of the mold from which they were formed. Exact replication is unlikely for three reasons. First, the dispersion will shrink, so the precursors of the shaped abrasive particles will be smaller than the cavities in which they are formed. Second, when the precursors of the shaped abrasive particles are removed from the mold cavities, some of their edges may break off or become rounded. Third, when the dispersion is introduced in the cavities, the dispersion may not completely fill the cavities. It should be noted that care should be taken throughout the process to minimize the foregoing factors.

The precursors of the shaped abrasive particles can be further dried outside of the mold. If the dispersion is dried to the desired level in the mold, this additional drying step is not necessary. However, in some instances it may be economical to employ this additional drying step to minimize the time that the dispersion resides in the mold. During this additional drying step, care must be taken to prevent cracks from forming in the precursors of the shaped abrasive particles. Typically, when water is the volatile component, the precursors of the shaped abrasive particles will be dried for from about 10 to about 480 minutes, preferably from about 120 to about 400 minutes, at a temperature from about 50° C. to about 160° C., preferably from about 120° C. to about 150° C.

The sixth step of the process of making shaped abrasive particles involves calcining the precursors of the shaped abrasive particles. During calcining, essentially all the volatile material is removed, and the various components that were present in the dispersion are transformed into metal oxides. The precursors of the shaped abrasive particle are generally heated to a temperature of from about 400° C. to about 800° C., and maintained within this temperature range until the free water and over 90% by weight of any bound volatile material are removed. In an optional step, it may be desired to introduce the modifying additive by an impregnation process. A water-soluble salt can be introduced by impregnation into the pores of the calcined precursors of the shaped abrasive particles. Then the precursors of the shaped abrasive particles are prefired again. This option is further described in European Patent Application No. 293,163, incorporated herein by reference.

The seventh step of the process of making shaped abrasive particles involves sintering the precursors of the shaped abrasive particles to form the shaped abrasive particles. Prior to sintering, the precursors of the shaped abrasive particles are not completely densified and thus lack the hardness to be used as shaped abrasive particles of this invention. Sintering takes place by heating the precursors of the shaped abrasive particle to a temperature of from about 1,000° C. to about 1,650° C. and maintaining them within this temperature range until substantially all of the alpha alumina monohydrate (or equivalent) is converted to alpha alumina and porosity is reduced to less than 15% by volume. The length of time to which the precursors of the shaped abrasive particles must be exposed to the sintering temperature to achieve this level of conversion depends upon various factors but usually from about five seconds to about 48 hours is typical. The preferred duration for sintering ranges from about one minute to about 90 minutes.

Other steps can be used to modify the process of this invention, such as rapidly heating the material from the calcining temperature to the sintering temperature, centrifuging the dispersion to remove sludge, waste, etc. Moreover, this process can be modified by combining two or more of the process steps, if desired. Conventional process steps that can be used to modify the process of this invention are more fully described in U.S. Pat. No. 4,314,827, incorporated herein by reference.

Figure 8:
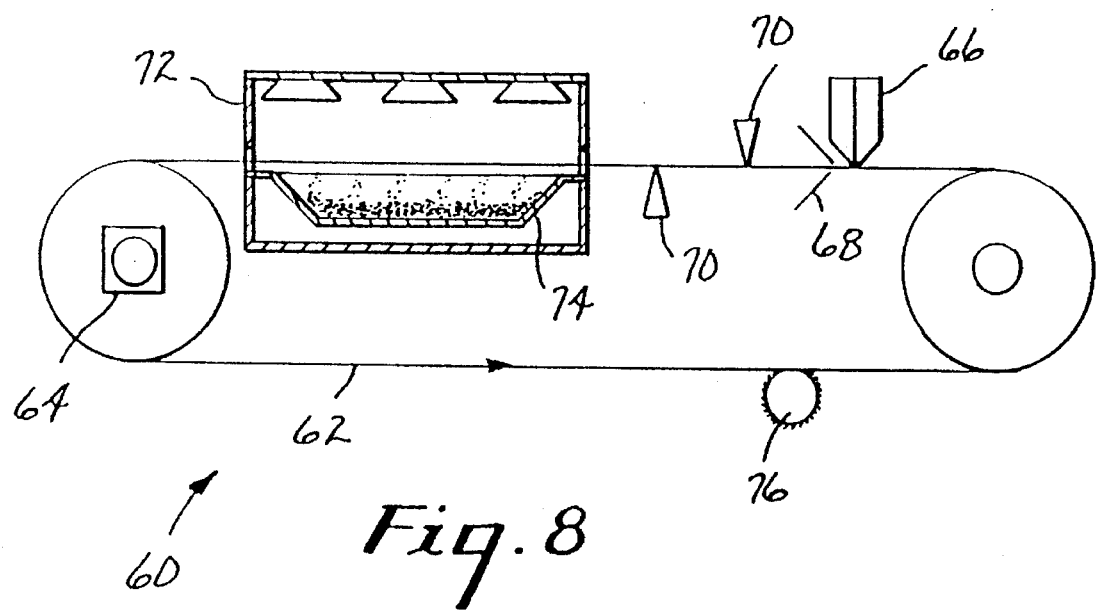
FIG. 8 is a side view of an apparatus for preparing abrasive particles that can be used in this invention.
Figure 9:
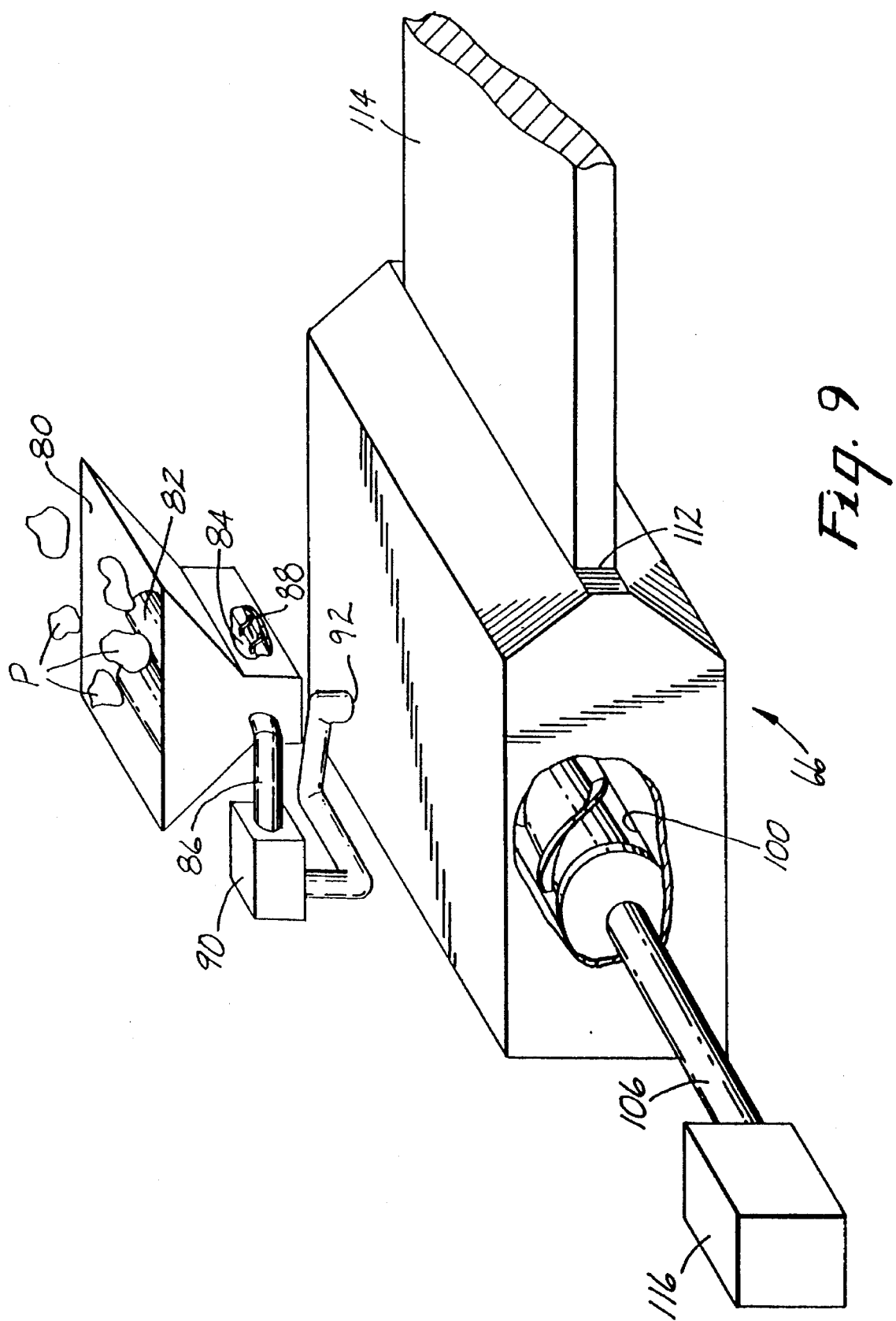
FIG. 9 is a schematic perspective view of a die that can be used in the apparatus of FIG. 8.
Figure 10:
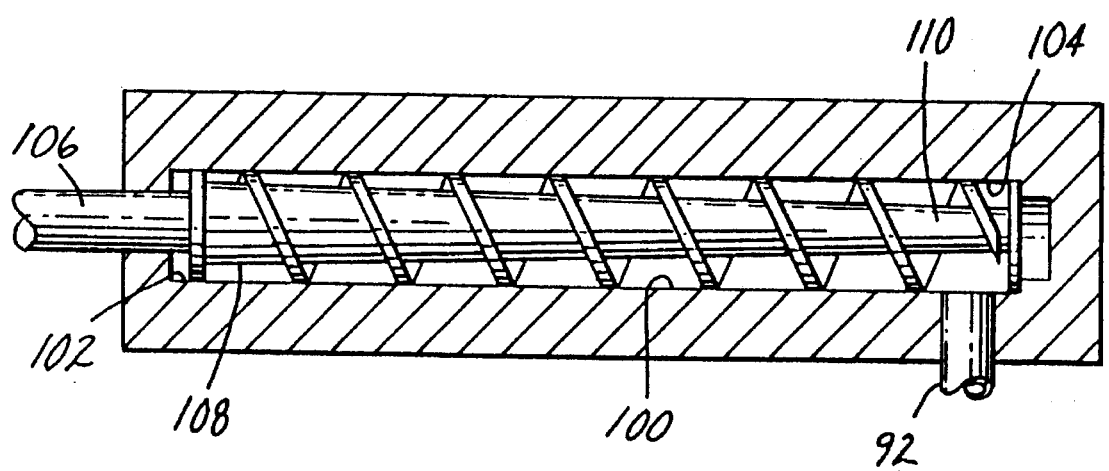
FIG. 10 is a sectional view of the auger and bore of the die body of FIG. 9.

As shown in FIG. 8, a continuous process can be used to make the shaped abrasive particles that can be used in this invention. The apparatus 60 in FIG. 8 comprises a mold 62, a driving mechanism 64, a die body 66, leading-edge wiper blades 68, levelling doctor blades 70, an oven 72, a collecting pan 74, and a brush 76. Referring now to FIG. 9, an extrudable dispersion containing particles "P" of a material that can be converted into alpha alumina (hereinafter "convertible material") in liquid is provided to supply means 80 for delivery to die body 66. Typical supply means can comprise a combination kneader and extruder 82, which includes twin, counter-rotating mixing blades that mix and pack the convertible material into an auger channel 84 for delivery through exit port 86 by a supply auger 88. Mixing and packing the convertible material aids in preventing voids that may produce a nonuniform sheet. The exit port 86 is connected to a pump 90, which pressurizes the convertible material and supplies it to a feed port 92 of die body 66.

Die body 66 includes a longitudinal bore 100 therein having first and second ends 102 and 104, respectively. Feed port 92 communicates the exterior of die body 66 with bore 80 adjacent second end 104. An auger 106 having first and second ends 108 and 110, respectively, is disposed within bore 100. Auger 106 comprises a longitudinal root and a helical flight adjoining the root along the length thereof. The flight diameter of auger 106 is constant, and the root has a first diameter at the first end 108, and a second diameter smaller than the first diameter at the second end 110. The flight depth of auger 106 is therefore greatest near feed port 92, and gradually decreases toward the first end 108 of auger 106, although the overall flight diameter is constant. The material conveying capacity of auger 106 thus gradually decreases along the length of the auger due to the gradually decreasing flight depth.

Die body 66 includes one or more elongate die openings 112 that communicate the exterior of die body 66 with bore 100 along the length of auger 106. In the preferred embodiment, die body 66 includes a single elongate die opening 112 that is adapted to form a uniform sheet member having a width substantially in excess of its thickness. The combination of the position of die opening 112 relative to auger 106 and the configuration of auger 106 tends to produce a uniform extruded sheet 114 of convertible material.

A motor 116 rotates auger 106 within bore 100 to extrude the convertible material in sheet form. The proper rotational speed of auger 106 may be experimentally or analytically determined to provide the desired uniform rate of extrusion. If auger 106 is rotated too slowly, excess convertible material may be discharged through the portion of die opening 112 nearest second end 104. Similarly, if auger 106 is rotated too quickly, excess convertible material may be discharged through the portion of die opening 112 nearest first end 102. At the proper rotational velocity, the pressure along bore 100 is uniform, thereby forcing a sheet of uniform thickness through die opening 112.

The dispersion is forced into cavities (not shown) of the mold 62 as it passes through the die opening 112. The mold 62 of FIG. 8 is a flexible belt, which is driven by the driving mechanism 64. The cavities in the mold 62 can have any desired planar shape, such as triangular, circular, or rectangular. The cavities can be formed by conventional means, such as by machining, punching, or etching. The flexible belt 62 can be made of any material that will withstand the operating conditions of the process. A belt made of metal such as stainless steel or aluminum is preferable. It is preferred that the mold 62 be coated with a release coating, such as polytetrafluoroethylene, to improve the release of the dried precursors of the shaped abrasive particles from the cavities of the mold 62.

It is preferred that the exposed surface or surfaces of the dispersion in the cavities not extend substantially beyond the plane of the belt in order to guarantee that the shaped abrasive particles prepared from the process be substantially uniform. Any excess dispersion surrounding the openings of the cavities and remaining on the non-recessed portion of the belt 62 is removed, preferably by leading-edge wiper blades 68 positioned down the belt 62 from the die body 66. The top and bottom surfaces of the belt 62 can be wiped by the leading-edge wiper blades 68. These blades 68 are mounted between leveling doctor blades 70 and the die body 66. The leveling doctor blades 70 further ensure that abrasive precursor particles will have a uniform thickness. It is preferred that wiper blades 68 be placed very close to the die, so that the wiping action does not lift the dispersion out of the cavities. If the wiper blades 68 are too far downstream from the die, excessive dispersion buildup may cause the dispersion in the cavities to cling to the dispersion on the surface of the belt.

The filled cavities in the belt 62 are moved into the oven 72, which is preferably an air circulating oven. The oven temperature is preferably set at approximately 75° C. However, the oven temperature can be higher or lower depending on the speed of the belt 62 and solids content of the precursor. The volatile component of the liquid is removed from the dispersion in the oven 72. Care should be taken to solidify the dispersion sufficiently slowly so that the formation of cracks in the shaped abrasive particles is minimized. As the volatile component is removed, the precursors of the shaped abrasive particles begin to form. Because their volume is less than that of the dispersion from which they are formed, they will fall out of the cavities in the belt 62, and can be collected in a collecting pan 74. The shaped, dried precursors of the shaped abrasive particles are then calcined and fired, preferably in a rotary kiln (not shown). Firing is preferably carried out at a temperature of 1300° C. to 1400° C. for a period of 1 to 15 minutes. Any dispersion or precursor material remaining on the belt 62 or in the cavities of the belt can be removed, preferably by a rotating brush 76 or other cleaning process.

In the extrusion method of preparing shaped abrasive particles, the dispersion is fed into an extruder and then extruded through an orifice of a die to form elongated precursors of abrasive particles. A sufficient amount of the volatile component is then removed from the elongated precursor of the abrasive particle such that the precursor is sufficiently dry so as to be capable of maintaining its elongated shape and cross-section. The conditions for removing volatile components are the same as those described previously. The shaped abrasive particles can be converted to the desired length before, during, or after drying the precursor. The conditions for calcining and sintering are the same as those described previously.

Figure 4:
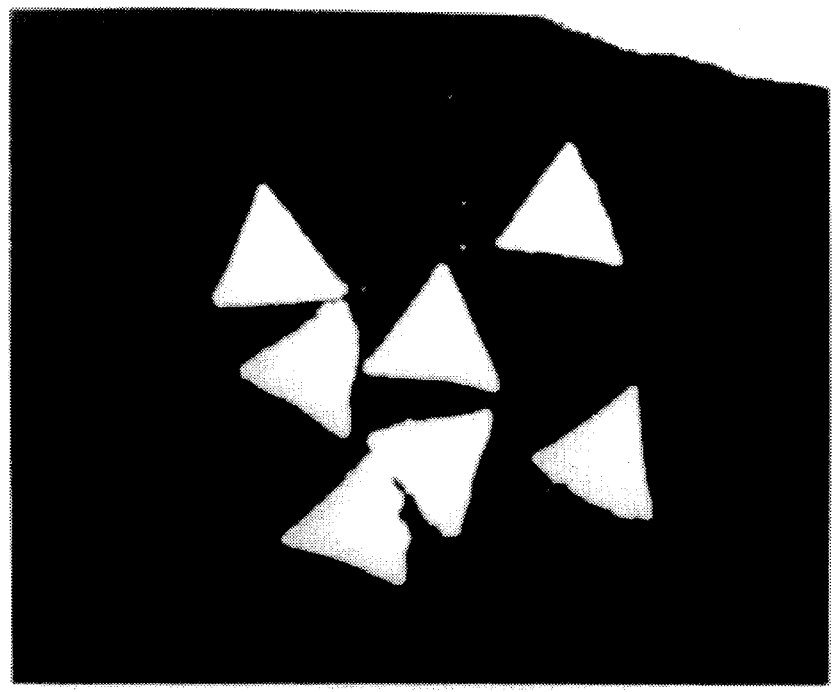
FIG. 4 is a photomicrograph taken at 12× illustrating shaped abrasive particles in which the planar shape is a triangular.
Figure 5:
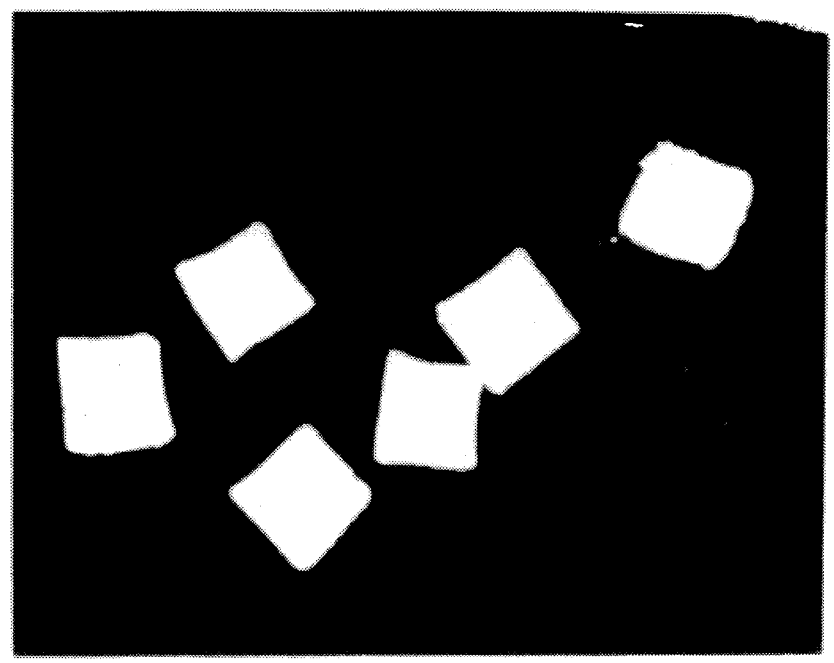
FIG. 5 is a photomicrograph taken at 12× illustrating shaped abrasive particles in which the planar shape is rectangular.
Figure 6:
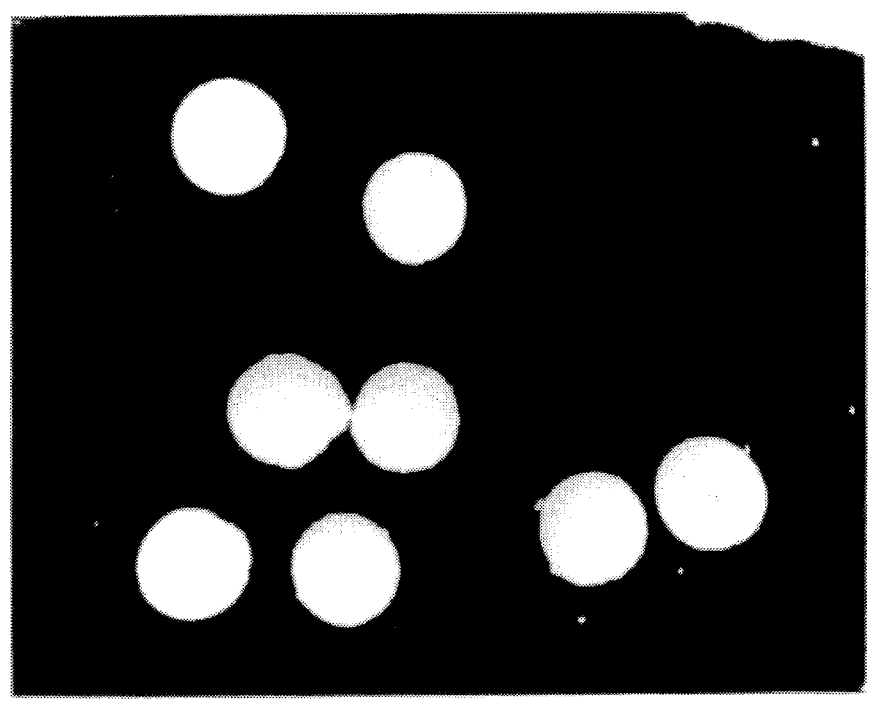
FIG. 6 is a photomicrograph taken at 12× illustrating shaped abrasive particles in which the planar shape is circular.

The shaped abrasive particles that can be used in this invention are preferably in the shape of thin bodies having a front face and a back face, the front face and the back face being separated by the thickness of the particle. The front face and the back face have substantially the same geometric shape. The geometric shape can be triangular, rectangular, circular, elliptical, or that of other regular or irregular polygons. The most preferred geometric shape is triangular. For the purposes of this invention, the sides of the geometric shapes also include polygons wherein one or more of the sides can be arcuate, for example, the definition of triangular extends to spherical triangles. Of triangular shapes, that of a plane equilateral triangle is the most preferred. FIG. 4 illustrates a picture taken at 12× magnification of a triangular-shaped abrasive particle. FIG. 5 illustrates a picture taken at 12× magnification of a square-shaped abrasive particle. FIG. 6 illustrates a picture taken at 12× magnification of a circular-shaped abrasive particle.

In most cases, the ratio of the length of the shortest facial dimension of the shaped abrasive particle to the thickness of the abrasive particle is at least 1 to 1, preferably at least 2 to 1, more preferably at least 5 to 1, most preferably at least 6 to 1. As used herein, the term "thickness", when applied to a shaped particle having a thickness that varies over its planar configuration, shall mean the minimum thickness. If the shaped particle is of substantially uniform thickness, the values of minimum, maximum, mean, and median thickness shall be substantially equal. For example, in the case of a particle in the shape of a triangle, if the thickness is equivalent to "a", the length of the shortest side of the triangle is preferably at least "2a". In the case of a shaped particle in which two or more of the shortest facial dimensions are of equal length, the foregoing relationship continues to hold. In most cases, the shaped abrasive particles are polygons having at least three sides, the length of each side being greater than the thickness of the shaped particle. In the special situation of a circle, ellipse, or a polygon having very short sides, the diameter of the circle, minimum diameter of the ellipse, or the diameter of the circle that can be circumscribed about the very short-sided polygon is considered to be the shortest facial dimension of the shaped particle. If a shaped abrasive particle is prepared in a mold cavity having a pyramidal, conical, frusto-pyramidal, frusto-conical, truncated spherical, or a truncated spheroidal shape, the thickness is determined as follows: (1) in the case of a pyramid or cone, the thickness is the length of a line perpendicular to the base of the particle and running to the apex of the pyramid or cone; (2) in the case of a frusto-pyramid or frusto-cone, the thickness is the length of a line perpendicular to the center of the larger base of the frusto-pyramid or of the frusto-cone and running to the smaller base of the frusto-pyramid or of the frusto-cone; (3) in the case of a truncated sphere or truncated spheroid, the thickness is the length of a line perpendicular to the center of the base of the truncated sphere or truncated spheroid and running to the curved boundary of the truncated sphere or truncated spheroid. The length of the shortest facial dimension of the shaped particle is the length of the shortest facial dimension of the base of the particle (if the particle has only one base) or the length of the shortest facial dimension of the larger base of the particle (if the particle has two bases). The thickness of the shaped particles preferably range from about 25 micrometers to 500 micrometers. This ratio provides improved performance of the shaped abrasive particle as compared with conventional unshaped abrasive grits. The shaped abrasive particles can also be elongated, i.e., in the shape of rods, such as, for example, rods having cylindrical or prismatic shapes. The ratio of the length of a rod to the maximum cross-sectional dimension of that rod is preferably at least 1 to 1, more preferably at least 2 to 1, and most preferably at least 3 to 1. As used herein, "maximum cross-sectional dimension of a rod" means the diameter of a circular cross-section of a rod or the diameter of a circle circumscribing a non-circular cross-section of a rod. The cross-sectional dimensions of a rod can vary along its length.

The diluent particles can comprise (1) a plurality of individual abrasive particles bonded together by an adhesive to form an agglomerate, (2) a plurality of individual non-abrasive particles bonded together by an adhesive to form an agglomerate, (3) a plurality of individual abrasive particles and a plurality of individual non-abrasive particles bonded together by an adhesive to form an agglomerate, (4) individual non-abrasive particle, (5) individual abrasive particles, or (6) combinations of the foregoing. The individual abrasive particles and the agglomerates containing them have irregular shapes or random shapes, i.e., they are excluded from the scope of the shaped abrasive particles.

However, individual non-abrasive particles and agglomerates containing individual non-abrasive particles, but free from individual abrasive particles, can have shapes that are equivalent to those of the shaped abrasive particles. The diluent particles typically have a particle size ranging from about 0.1 to 1500 micrometers, usually from about 1 to about 1300 micrometers. It is preferred that the abrasive particles have a Mohs' hardness of at least about 8, more preferably at least about 9. Examples of materials of such abrasive particles include fused aluminum oxide, ceramic aluminum oxide, heat treated aluminum oxide, silicon carbide, alumina zirconia, diamond, ceria, cubic boron nitride, silicon nitride, garnet, and combinations thereof. It is preferred that the non-abrasive particles have a Mohs' hardness less than about 7. Examples of non-abrasive particles include metal carbonates such as calcium carbonate (chalk, calcite, travertine, marble, and limestone), calcium magnesium carbonate, sodium carbonate, magnesium carbonate, silica (such as glass beads, glass bubbles, glass fibres), silicates, such as talc, clay (montmorillonite), feldspar, mica, calcium silicate, calcium metasilicate, sodium aluminosilicate, sodium silicate, metal sulfates, such as calcium sulfate, barium sulfate, sodium sulfate, aluminum sodium sulfate, aluminum sulfate, gypsum, vermiculite, wood flour, aluminum trihydrate, carbon black, metal oxides, such as calcium oxide (lime), aluminum oxide, titanium dioxide, and metal sulfites (such as calcium sulfite). Still other examples of non-abrasive particles include halide salts, e.g., sodium chloride, potassium cryolite, sodium cryolite, ammonium cryolite, potassium tetrafluoroborate, sodium tetrafluoroborate, silicon fluorides, potassium chloride, and magnesium chloride. Still other examples of non-abrasive particles include sulfur, organic sulfur compounds, graphite, and metallic sulfides.

As stated previously, individual abrasive particles or individual non-abrasive particles can be bonded together by an adhesive to form an agglomerate. The adhesive that can be used for bonding can be inorganic or organic. Examples of inorganic adhesives include metallic or vitreous binders. Examples of organic adhesives include phenolic resins, aminoplast resins, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorene modified epoxy resins, and mixtures thereof. Depending upon the particular adhesive, the precursor of the adhesive may further include a catalyst or curing agent. The catalyst and/or curing agent can help to initiate or accelerate the polymerization process or both. The agglomerate may further include additives such as fillers (including grinding aids), fibres, lubricants, wetting agents, surfactants, pigments, dyes, coupling agents, plasticizers, and suspending agents. The amount of these materials can be selected to provide the properties desired. Examples of such agglomerates are described in U.S. Pat. Nos. 2,194,472; 4,311,489; 4,132,533; 4,393,021; 4,541,842; 4,652,275; 4,799,939; 5,078,753; and 5,093,311.

In general, the ratio of the size of the shaped abrasive particles to the size of the diluent particles can range from about 2.5:1 to about 0.5:1. If the diluent particles are too small, relative to the shaped abrasive particles, insufficient support will be given to the shaped abrasive particles and performance of the coated abrasive article may be adversely affected. If the diluent particles are too large, relative to the shaped abrasive particles, the diluent particles could prevent the shaped abrasive particles from contacting the workpiece. The size of the diluent particles can range from about 50 to about 1,500 micrometers, and preferably ranges from about 100 to about 1,200 micrometers. It is preferred that the diluent particles and the shaped abrasive particles be of approximately the same particle size range.

Figure 3:
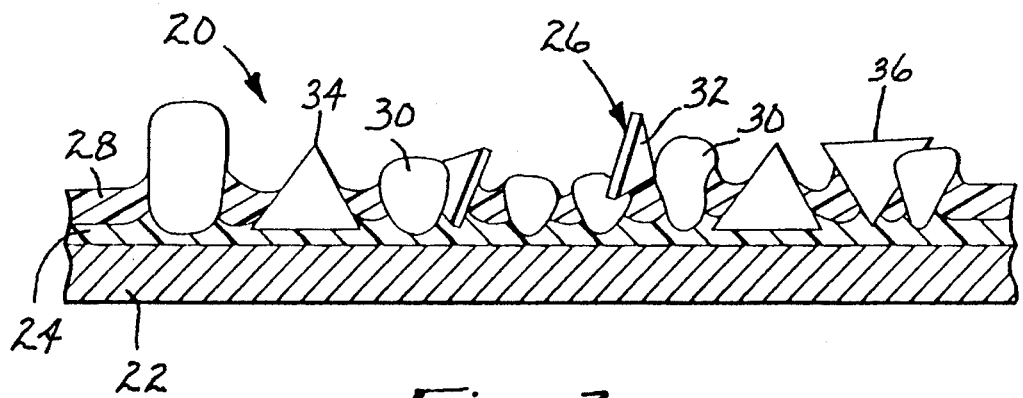
FIG. 3 is an enlarged sectional view of a fragment of a coated abrasive article of this invention that employs shaped abrasive particles.
Figure 7:
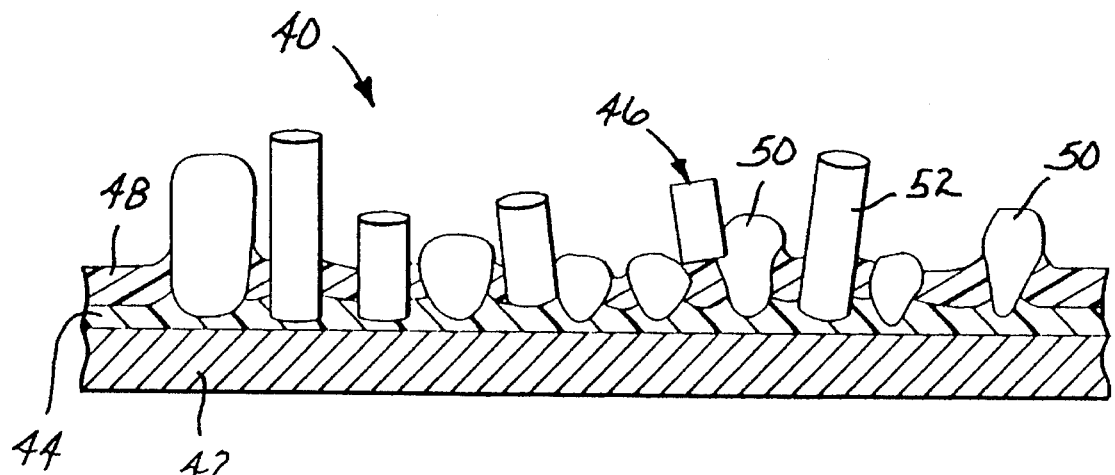
FIG. 7 is an enlarged sectional view of a fragment of another embodiment of a coated abrasive article of this invention that employs shaped abrasive particles.

FIGS. 3 and 7 illustrate two embodiments of the coated abrasive article of the present invention. Referring to FIG. 3, a coated abrasive article 20 comprises a backing 22, a first binder 24, an abrasive coating 26, and a second binder 28. The abrasive coating 26 comprises diluent particles 30 and shaped abrasive particles 32. The diluent particles are disposed in an open coat. The shaped abrasive particles are also disposed in an open coat. The diluent particles 30 function as a support or reinforcement for the shaped abrasive particles 32. The article in FIG. 3 has two binders. The first binder 24 is commonly referred to as a make coat and is applied over the backing 22. The second binder 28 is commonly referred to as a size coat and is applied over the shaped abrasive particles 32 and diluent particles 30. The size coat reinforces the abrasive coating 26.

It is preferred that a portion of the shaped abrasive particles have a triangular-shape. These shaped abrasive particles will hereinafter be designated as triangular-shaped abrasive particles. Of these triangular-shaped abrasive particles, from about 35% to about 65% are oriented to the backing with a vertex 34 of the triangle pointing away from the backing as illustrated by FIG. 3. The remainder of these triangular-shaped abrasive particles are oriented with a base 36 of the triangle pointing away from the backing. However, up to 20% of the particles may not be oriented in either of the preceding ways, e.g., they may lay such that their faces are substantially parallel to the backing. As used herein, the phrase "vertex pointing away from the backing" and the like means that a base of the triangular-shaped particle is positioned toward the backing; the phrase "vertex pointing away from the backing" also includes those situations in which the line corresponding to the altitude of the triangular-shaped particle is tilted from the perpendicular at a small angle, typically less than 45°, preferably less than 30°. As used herein, the phrase "base pointing away from the backing" and the like means that a vertex of the triangular-shaped particle is positioned toward the backing; the phrase "base pointing away from the backing" includes those situations in which the line corresponding to the altitude of the triangular-shaped particle is tilted from the perpendicular at a small angle, typically less than 45°, preferably less than 30°.

During the manufacture of the coated abrasive article, the triangular-shaped abrasive particles are preferably applied by electrostatic coating techniques. Electrostatic coating causes a portion of the triangular-shaped abrasive particles to be oriented with a base pointing away from the backing and a portion to be oriented with a vertex pointing away from the backing.

It is to be expected that a small number of triangular-shaped abrasive particles will fail to have a base or a vertex oriented toward the backing and will have the triangular face substantially parallel to the backing. These shaped particles will exhibit less cutting. The number of shaped particles lying flat will increase at lower weights of diluent particles. During electrostatic deposition of the shaped abrasive particles, preferred orientation of the abrasive particles is easier to maintain when the space between the diluent particles is so small that the shaped particles do not have sufficient room to tip over during deposition.

Referring to FIG. 7, a coated abrasive article 40 comprises a backing 42, a first binder 44, an abrasive coating 46, and a second binder 48. The abrasive coating 46 comprises diluent particles 50 and shaped abrasive particles 52. Both the diluent particles and the shaped abrasive particles are disposed in an open coat. The diluent particles 50 function as a support or reinforcement for the shaped abrasive particles 52. The first binder 44, i.e., the make coat, is applied over the backing 42. The second binder 48, i.e., the size coat, is applied over the shaped abrasive particles 52 and diluent particles 50. The size coat reinforces the abrasive coating 46. The abrasive particles 52 are in the shape of rods.

If the diluent particles are deposited in a closed coat, i.e., a coat in which the particles substantially completely cover the backing, a high percentage of shaped abrasive particles will reside above the diluent particles.

The coated abrasive article of FIG. 3 can be prepared by applying the first binder 24 to the front surface of the backing 22. Then the diluent particles 30 are embedded in the first binder 24. The diluent particles 30 can be applied by drop coating or electrostatic coating. The diluent particles 30 can be applied in an open coat or closed coat. In an open coat, a portion of the backing is free of diluent particles. In a closed coat, substantially all of the backing is covered by diluent particles. Then the shaped abrasive particles 32 can be applied over the diluent particles 30 and the first binder 24 by drop coating or electrostatic coating. The shaped abrasive particles 32 can be applied in an open coat or closed coat. After the shaped abrasive particles are applied, the first binder 24 is at least partially cured. Finally, the second binder 28 is applied over the abrasive coating 26. Then the second binder 28 is cured. Curing of the second binder 28 results in additional curing of the first binder 24, if the first binder 24 has been only partially cured. It is preferred to apply the diluent particles 30 by drop coating and the shaped abrasive particles 32 by electrostatic coating. Because the diluent particles 30 are applied first, the close or open nature of the coating of the diluent particles determine whether the shaped abrasive particles reside substantially between the diluent particles (diluent particles in open coat) or reside substantially between and above the diluent particles (diluent particles in closed coat). The coated abrasive article of FIG. 7 can be prepared in substantially the same manner as was described to prepare the coated abrasive article of FIG. 3.

The volume ratio of shaped abrasive particles to diluent particles can vary from 95:5 to 5:95, typically from 30:70 to 70:30, and preferably from 40:60 to 60:40. It is preferred that the uppermost layer consist essentially of shaped abrasive particles. The layers underlying the uppermost layer preferably contain a majority of diluent particles.

Blends of shaped abrasive particles having different shapes can be used in the articles of this invention. The shaped abrasive particles may also have a surface coating. Surface coatings are known to improve the adhesion between abrasive grains and the binder in abrasive articles. Additionally, the surface coating may prevent the shaped abrasive particle from capping. Capping is the term to describe the phenomenon where metal particles from the workpiece being abraded become welded to the tops of the abrasive particles. Such surface coatings are described in U.S. Pat. Nos. 5,011,508; 1,910,444; 3,041,156; 5,009,675; 5,085,671; 4,997,461; and 5,042,991, all of which are incorporated herein by reference.

The coated abrasive articles of the present invention provide a cut that compares favorably with the cut provided by coated abrasive articles containing only high quality abrasive grits, such as, for example, "Cubitron" grits, available from Minnesota Mining and Manufacturing Company, with no diluent particles. Yet, the coated abrasive articles of the present invention can be prepared at a lower cost than articles containing an equivalent amount of high quality abrasive grits.

The following examples are illustrative of specific embodiments of this invention; however, these examples are for illustrative purposes only and are not to be construed as limitations upon the invention.

The following procedures were used for Examples 1–20.

Procedure for Making Shaped Abrasive Particles

A dispersion (44% solids) was made by the following procedure: alpha aluminum oxide monohydrate powder (1,235 parts) having the trade designation "DISPERAL" and aqueous dispersion of FeOOH were dispersed by continuous mixing in a solution containing water (3,026 parts) and 70% aqueous nitric acid (71 parts).

In the case of triangular-shaped particles, the FeOOH was about 0.1 micrometer in length and 0.02 micrometer in width and consisted of about 3% by weight solids in deionized water. The resulting triangular-shaped particles contained 1.25% by weight $Fe_2O_3$, 4.5% by weight magnesia, with the remainder being alumina. The triangular-shaped particles contained a surface treatment of the type described in U.S. Pat. No. 5,011,508.

In the case of square-shaped and rod-shaped particles, the FeOOH was about 0.4 micrometer in length and 0.05 micrometer in width and consisted of about 10% by weight solids in deionized water. The square-shaped and rod-shaped particles contained 2% by weight $Fe_2O_3$, 4.5% by weight magnesia, with the remainder being alumina.

The sol that resulted was mixed with magnesium nitrate (429 parts) to form a gel which was then dried at a temperature of approximately 125° C. in a continuous dryer to produce the 44% solids dispersion. In the case of triangular-shaped particles and square-shaped particles, the dispersion was introduced into cavities of the desired shape in a mold by means of a rubber squeegee. The cavities were coated with a release coating, either a silicone material or polytetrafluoroethylene. In the case of triangular-shaped particles, the dimensions of the mold cavities were 0.29 cm on each side and 0.05 cm in depth. In the case of square-shaped particles the dimensions of the mold cavities were 0.23 cm on each side and 0.06 cm deep. The filled mold was placed in a forced air oven maintained at a temperature of 71° C. for 20 minutes. The dispersion underwent substantial shrinkage as it dried, and the dried precursors of the shaped abrasive particles shrank in the cavities. The precursors of the shaped abrasive particles were removed from the mold by gravity. After the precursors of the shaped abrasive particles were removed from the mold, they were dried at a temperature of 121° C. for three hours. For the rods, after the precursor dispersion was gelled, it was extruded into rods by means of a screw extruder. During drying, the rods broke into lengths. They were then screened to size. The dimensions of the dried rods were about 0.6 mm diameter by about 0.6 to 2.4 mm length, with the median length being about 1.6 mm.

The dried precursors of the shaped abrasive particles were introduced into the end of a calciner, which can be described as a 23 cm diameter, 4.3 m long stainless steel tube having a 2.9 m hot zone, the tube being inclined at 2.4° with respect to the horizontal, and rotating at 6 rpm, providing residence time therein of about 15 minutes. The entry end temperature of the hot zone was 350° C. and the exit end temperature of the hot zone was 800° C. The material exiting the calciner was introduced into a kiln held at a temperature of about 1,390° C. The kiln was a 8.9 cm diameter, 1.32 m long silicon carbide tube inclined at 4.4° with respect to the horizontal, having a 76 cm hot zone, and rotating at 10.5 rpm, providing a residence time therein of about four minutes. The material exited the kiln into air at room temperature, where it was collected in a metal container and allowed to cool to room temperature.

Procedure for Making Diluent Particles

A resole phenolic resin, sodium cryolite, a 10% aqueous dispersion of wood pulp, a glass bubble filler (Microspheres S22, commercially available from Minnesota Mining and Manufacturing Company), and water were introduced into a Hobart mixer Model L-800, and the resulting mixture was mixed until it appeared to be a homogeneous dispersion. The resulting mixture, which was highly viscous, was spread out onto a shallow metal tray to a depth of about 3.5 to 6.5 cm and cured for 16 hours at a temperature of approximately 100° C. The resulting material was crushed by a roll crusher to reduce its size. The crushed material was again crushed by a roll crusher, and screened. The resulting diluent particles consisted of 35.5 parts by weight cured resole phenolic resin, 61.1 parts by weight sodium cryolite, 1.0 part by weight wood pulp, and 2.4 parts by weight glass bubbles. The diluent particles, hereinafter referred to as DP I, were screened to a size range of about 589 to 1350 micrometers, such that they passed through a 16 mesh stainless steel screen, but were retained on a 34 mesh stainless steel screen.

Procedure for Making Coated Abrasive Articles

A make coat was coated onto a 0.76 mm thick vulcanized fibre disc having a diameter of about 17.8 cm and a 2.2 cm center hole. The make coat comprised 48% by weight resole phenolic resin and 52% by weight calcium carbonate and was diluted to 81% solids with water and glycol ether solvent. The wet weight of the make coat was 377 g/m². The abrasive coating consisted of two materials. The first material was selected from the group consisting of individual abrasive particles, individual non-abrasive particles, and a plurality of diluent particles agglomerated into a mass. These materials were electrostatically coated onto the make coat. The second material was selected from the group consisting of individual abrasive particles and shaped abrasive articles. These materials were also electrostatically coated. The resulting construction was heated at a temperature of 77° C. for 15 minutes and then at a temperature of 93° C. for 8 hours to cure the make coat. A size coat was then coated over the abrasive coating at an average weight of about 670 g/m². The size coat had been diluted to 78% solids with water and glycol ether solvent and contained 32% by weight resole phenolic resin and 68% by weight sodium cryolite. The size coat was cured at a temperature of 77° C. for one hour and then at a temperature of 102° C. for 16 hours. The fibre discs were flexed prior to testing.

Test Procedure I

Test Procedure I measured the cut rate of the disc and the amount of metal removed from the workpiece in 12 minutes. The coated abrasive disc was mounted on a beveled aluminum back-up pad and used to grind the face of a 1.25 cm by 18 cm 1018 mild steel workpiece. The disc was driven at 5,500 rpm while the portion of the disc overlaying the beveled edge of the back-up pad contacted the workpiece at a load of about 6 kg. Each disc was used to grind a different workpiece for a one minute interval for a total time of 12 minutes. Twelve different workpieces were used in this procedure for each disc. The initial cut was the amount of metal removed in the first minute of grinding. The final cut was the amount of metal removed in the last minute of grinding. The total cut was the summation of the amount of metal removed throughout the test. In most of the examples, the performance of the abrasive article was stated as percent of control, i.e., the total amount of metal removed for the control example was equated to 100% and the material removed by the abrasive articles of the examples was measured relative to 100%. Approximately three discs were tested for each sample.

Test Procedure II

Test Procedure II measured the amount of metal removed in 8 minutes of grinding at high grinding pressures. The test equipment included the coated abrasive disc attached to a hard phenolic backup pad (16.5 cm diameter, 1.57 mm thick) which was in turn mounted on a steel flange (15.2 cm diameter). The test disc so supported was rotated at 3550 rpm. A 25 cm diameter 1018 carbon steel disc-shaped workpiece was placed into contact with the abrasive face of the abrasive disc under a load of 2.9 kg. The 1.8 mm peripheral edge of the workpiece was deployed 18.5° from a position normal to the abrasive disc and rotated counter clockwise at 2 rpm. At the start and end of the test, the workpiece was weighed to determine the amount of steel removed or abraded. The endpoint of the test was 8 minutes of grinding. The total cut was the amount of steel abraded during the entire test. The values listed in the tables were measured as a percent of the Comparative Example. Approximately three discs were tested for each example.

Test Procedure III

Test Procedure III was the same as Test Procedure II except that the angle was 7° rather and 18.5° and the load at the abrading interface was 2.7 kg.

Test Procedure IV

Test Procedure IV measured the amount of metal removed in 5 minutes. The test equipment included a 12.7 cm diameter coated abrasive disc having a 2.2 cm center hole attached to a hard black fibre backup pad (11.9 cm diameter, 1.9 mm thick). The discs were mounted on a pneumatic disc grinder from Allen Air Inc., St. Louis, Mo., with a line air pressure of 90 psi. The workpiece was a 6 mm by 27.9 cm weld bead that had been laid down onto a steel plate. The thickness or height of the weld bead was initially about 6 to 13 mm. The test consisted of moving the abrasive disc onto the horizontally mounted workpiece and applying a downward force. The total cut was the amount of weld material abraded during the 5 minute test. The values listed in the tables were measured as a percent of the Comparative Example.

Examples 1–2 and Comparative Example A

These examples compared various coated abrasive constructions. The resulting fibre discs were tested according to Test Procedures II and III and the results are set forth in Table 1.

The fibre disc of Example 1 contained two abrasive materials. The first abrasive material consisted of about 800 g/m² of grade 24 heat treated fused aluminum oxide. The second abrasive material consisted of about 390 g/m² of triangular-shaped particles.

The fibre disc of Example 2 contained only one abrasive material. This material consisted essentially of about 980 g/m² of triangular-shaped particles.

The fibre disc of Comparative Example A contained two abrasive materials. The first abrasive material consisted of about 800 g/m² of grade 24 heat treated fused aluminum oxide. The second abrasive material consisted of about 390 g/m² of grade 24 "221 Cubitron" particles, commercially available from Minnesota Mining and Manufacturing Company, St. Paul, Minn.

TABLE 1

| Example No. | Test Procedure | |
|---|---|---|
| | II (%) | III (%) |
| Comp. A | 100 | 100 |
| 1 | 100 | 149 |
| 2 | 143 | 182 |

The coated abrasive articles of Examples 1 and 2 outperformed the coated abrasive article of Comparative Example A in Test Procedure III.

Examples 3–9 and Comparative Example A

These examples compared various coated abrasive constructions. The fibre discs were tested according to Test Procedures I through IV and the results are set forth in Table 2.

The fibre disc of Example 3 contained two abrasive materials. The first abrasive material consisted of about 800 g/m² of grade 24 heat treated fused aluminum oxide. The second abrasive material consisted of about 390 g/m² of triangular-shaped particles.

The fibre disc of Example 4 contained one abrasive material and one material selected from the class of diluent particles. The diluent particles consisted of about 210 g/m² of DP I. The abrasive material consisted of about 390 g/m² of triangular-shaped particles.

The fibre disc of Example 5 contained two abrasive materials. The first abrasive material consisted of about 712 g/m² of grade 24 heat treated fused aluminum oxide. The second abrasive material consisted of about 480 g/m² of triangular-shaped particles.

The fibre disc of Example 6 contained one abrasive material and one material selected from the class of diluent particles. The diluent particles consisted of about 190 g/m² of DP I. The abrasive material consisted of about 480 g/m² of triangular-shaped particles. The fibre disc of Example 7 contained two abrasive materials. The first abrasive material consisted of about 610 g/m² of grade 24 heat treated fused aluminum oxide. The second abrasive material consisted of about 590 g/m² triangular-shaped particles. The fibre disc of Example 8 contained one abrasive material and one material selected from the class of diluent particles. The diluent particles consisted of about 160 g/m² of DP I. The abrasive material consisted of about 590 g/m² of triangular-shaped particles. The fibre disc of Example 9 contained only one abrasive material. This material consisted essentially of about 1005 g/m² of triangular-shaped particles.

TABLE 2

| Example | Test Procedure | | | |
|---|---|---|---|---|
| | I (%) | II (%) | III (%) | IV (%) |
| Comp. A | 100 | 100 | 100 | 100 |
| 3 | 118 | 114 | 150 | 124 |
| 4 | 132 | 106 | 194 | 149 |
| 5 | 119 | 128 | 156 | 136 |
| 6 | 130 | 134 | 198 | 150 |
| 7 | — | 108 | 91 | 105 |
| 8 | 132 | 140 | 205 | 163 |
| 9 | 140 | 130 | 182 | 165 |

The coated abrasive articles of Examples 3–9 outperformed the coated abrasive article of Comparative Example A in Test Procedures II and IV. The coated abrasive articles of Examples 3–6 and 8–9 outperformed the coated abrasive article of Comparative Example A in Test Procedures I and II. Test Procedure I was not run for the coated abrasive article of Example 7.

Examples 10–12 and Comparative Examples A and B

These examples compared various coated abrasive constructions. The fibre discs were tested according to Test Procedures I through IV and the results are set forth in Table 3.

The fibre disc of Example 10 contained one abrasive material and one material selected from the class of diluent particles. The diluent particles consisted of about 610 g/m² of grade 24 marble particles. The abrasive material consisted of about 390 g/m² of triangular-shaped particles.

The fibre disc of Example 11 contained one abrasive material and one material selected from the class of diluent particles. The diluent particles consisted of about 460 g/m² of grade 24 marble particles. The abrasive material consisted of about 590 g/m² of triangular-shaped particles.

The fibre disc of Example 12 contained one abrasive material and one material selected from the class of diluent particles. The diluent particles consisted of about 590 g/m² of DP I. The abrasive material consisted of about 590 g/m² of triangular-shaped particles.

The fibre disc of Comparative Example B contained one abrasive material and one material selected from the class of diluent particles. The diluent particles consisted of about 460 g/m² of grade 24 marble particles. The abrasive material consisted of about 590 g/m² of grade 24 "221 Cubitron" particles, commercially available from Minnesota Mining and Manufacturing Company, St. Paul, Minn.

TABLE 3

| Example | Test Procedure | | | |
|---|---|---|---|---|
| | I (%) | II (%) | III (%) | IV (%) |
| Comp. A | 100 | 100 | 100 | 100 |
| Comp. B | 112 | 53 | 115 | 124 |
| 10 | 135 | 81 | 179 | 180 |
| 11 | 136 | 81 | 212 | 176 |
| 12 | 148 | 134 | 227 | 182 |

The coated abrasive article of Example 12 outperformed the coated abrasive articles of Comparative Examples A and B in Test Procedures I, II, III, and IV. The coated abrasive articles of Examples 10 and 11 outperformed the coated abrasive article of Comparative Example B in Test Procedures I, II, III, and IV. The coated abrasive articles of Examples 10 and 11 outperformed the coated abrasive article of Comparative Example A in Test Procedures I, III, and IV.

Examples 13–18 and Comparative Examples C and D

These examples compared various coated abrasive constructions. The resulting fibre discs were tested according to Test Procedures I and II and the results are set forth in Table 4.

The fibre disc of Example 13 contained two abrasive materials. The first abrasive material consisted of about 710 g/m$^2$ of grade 24 heat treated aluminum oxide. The second abrasive material consisted of about 480 g/m$^2$ of triangular-shaped particles.

The fibre disc of Example 14 contained one abrasive material and one material selected from the class of diluent particles. The diluent particles consisted of about 190 g/m$^2$ of DP I. The abrasive material consisted of about 480 g/m$^2$ of triangular-shaped particles.

The fibre disc of Example 15 contained two abrasive materials. The first abrasive material consisted of about 710 g/m$^2$ of grade 24 heat treated aluminum oxide. The second abrasive material consisted of about 480 g/m$^2$ of grade 36 rods.

The fibre disc of Example 16 contained one abrasive material and one material selected from the class of diluent particles. The diluent particles consisted of about 190 g/m$^2$ of DP I. The second abrasive material consisted of about 480 g/m$^2$ of grade 36 rods.

The fibre disc of Example 17 contained two abrasive materials. The first abrasive material consisted of about 530 g/m$^2$ of grade 36 heat treated aluminum oxide. The second abrasive material consisted of about 480 g/m$^2$ of grade 36 rods.

The fibre disc of Example 18 contained one abrasive material and one material selected from the class of diluent particles. The diluent particles consisted of about 130 g/m$^2$ of DP I. The diluent particles were screened to a size range of about 297 to 710 micrometers, such that they passed through a 25 U.S. standard screen, but were retained on a 50 U.S. standard screen. The abrasive material consisted of about 480 g/m$^2$ of grade 36 rods.

The fibre disc of Comparative Example C contained two abrasive materials. The first abrasive material consisted of about 710 g/m$^2$ of grade 24 heat treated aluminum oxide. The second abrasive material consisted of about 480 g/m$^2$ of grade 24 "221 Cubitron" particles, commercially available from Minnesota Mining and Manufacturing Company, St. Paul, Minn.

The fibre disc of Comparative Example D contained one abrasive material and one material selected from the class of diluent particles. The diluent particles consisted of about 190 g/m$^2$ of DP I. The abrasive material consisted of about 480 g/m$^2$ of grade 24 "221 Cubitron" particles, commercially available from Minnesota Mining and Manufacturing Company, St. Paul, Minn.

TABLE 4

| Example | Test Procedure I (%) | Test Procedure II (%) |
| --- | --- | --- |
| Comp. C | 100 | 100 |
| Comp. D | 105 | 112 |
| 13 | 121 | 120 |
| 14 | 134 | 128 |
| 15 | 75 | 94 |
| 16 | 87 | 99 |
| 17 | 85 | 88 |
| 18 | 76 | 90 |

The coated abrasive articles of Examples 13 and 14 outperformed the coated abrasive articles of Comparative Examples C and D in Test Procedures I and II.

Examples 13–20 and Comparative Examples C and D

These examples compared various coated abrasive constructions. Examples 13–18 and Comparative Examples C and D were described previously. The resulting fibre discs were tested according to Test Procedure III and the results are set forth in Table 5.

The fibre disc of Example 19 contained two abrasive materials. The first abrasive material consisted of about 710 g/m$^2$ of grade 24 heat treated aluminum oxide. The second abrasive material consisted of about 480 g/m$^2$ of square-shaped particles.

The fibre disc of Example 20 contained one abrasive material and one material selected from the class of diluent particles. The diluent particles consisted of about 190 g/m$^2$ of DP I. The abrasive material consisted of about 480 g/m$^2$ of square-shaped particles.

TABLE 5

| Example | Total cut (%) |
| --- | --- |
| Comp. C | 100 |
| Comp. D | 128 |
| 13 | 174 |
| 14 | 217 |
| 15 | 71 |
| 16 | 93 |
| 17 | 71 |
| 18 | 71 |
| 19 | 168 |
| 20 | 170 |

The coated abrasive articles of Examples 13, 14, 19, and 20 outperformed the coated abrasive articles of Comparative Examples C and D in total cut.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. A coated abrasive article comprising:
   (a) a backing having two major surfaces;
   (b) at least one binder;
   (c) an abrasive coating comprising (1) shaped abrasive particles, wherein the ratio of the length of said shaped abrasive particles to the maximum cross-sectional dimension of said shaped abrasive particles is at least 2 to 1, and (2) diluent agglomerates;

said at least one binder serving to bond said abrasive coating to at least one major surface of said backing.

2. A coated abrasive article according to claim 1, wherein said diluent agglomerates comprise adhesive and a plurality of individual particles selected from the group consisting of (1) abrasive particles, (2) non-abrasive particles, and (3) abrasive particles and non-abrasive particles.

3. A coated abrasive article according to claim 1, wherein said shaped abrasive particles have cross-sectional dimensions that vary along said length.

4. A coated abrasive article according to claim 1, wherein said ratio is at least 3 to 1.

5. A coated abrasive article according to claim 1, wherein said shaped abrasive particles comprise alpha alumina.

6. A coated abrasive article according to claim 5, wherein said shaped abrasive particles comprise alpha alumina and a nucleating agent.

7. A coated abrasive article according to claim 2, wherein said plurality of individual abrasive particles is selected from the group consisting of alumina, diamond, cubic boron nitride, silicon carbide, silicon nitride, ceria, alumina zirconia, and garnet.

8. A coated abrasive article according to claim 2, wherein said non-abrasive particles have a Mohs' hardness of less than about 7.

9. A coated abrasive article according to claim 2, wherein said non-abrasive particles are selected from the group consisting of metal carbonates, silica, silicates, metal sulfates, gypsum, vermiculite, wood flour, aluminum trihydrate, carbon black, metal oxides, metal sulfites, halide salts, sulfur, organic sulfur compounds, graphite, and metallic sulfides.

10. A coated abrasive article according to claim 1, wherein said shaped abrasive particles reside substantially between said diluent agglomerate particles.

11. A coated abrasive article according to claim 1, wherein the ratio of the length of said shaped abrasive particles to the size of said diluent agglomerates ranges from about 2.5:1 to about 0.5:1.

* * * * *

UNITED STATES PATENT AND TRADEMARK OFFICE
CERTIFICATE OF CORRECTION

PATENT NO. : 5,584,896
DATED : December 17, 1996
INVENTOR(S) : David E. Broberg and Donna W. Bange It is certified that error appears in the above-identified patent and that said Letters Patent is hereby corrected as shown below:

On the title page, item [57], in the
ABSTRACT, line 1 "Seated" should read --Coated--

Signed and Sealed this

Twenty-seventh Day of October, 1998

Attest:

BRUCE LEHMAN

Attesting Officer

Commissioner of Patents and Trademarks